Figure 1:
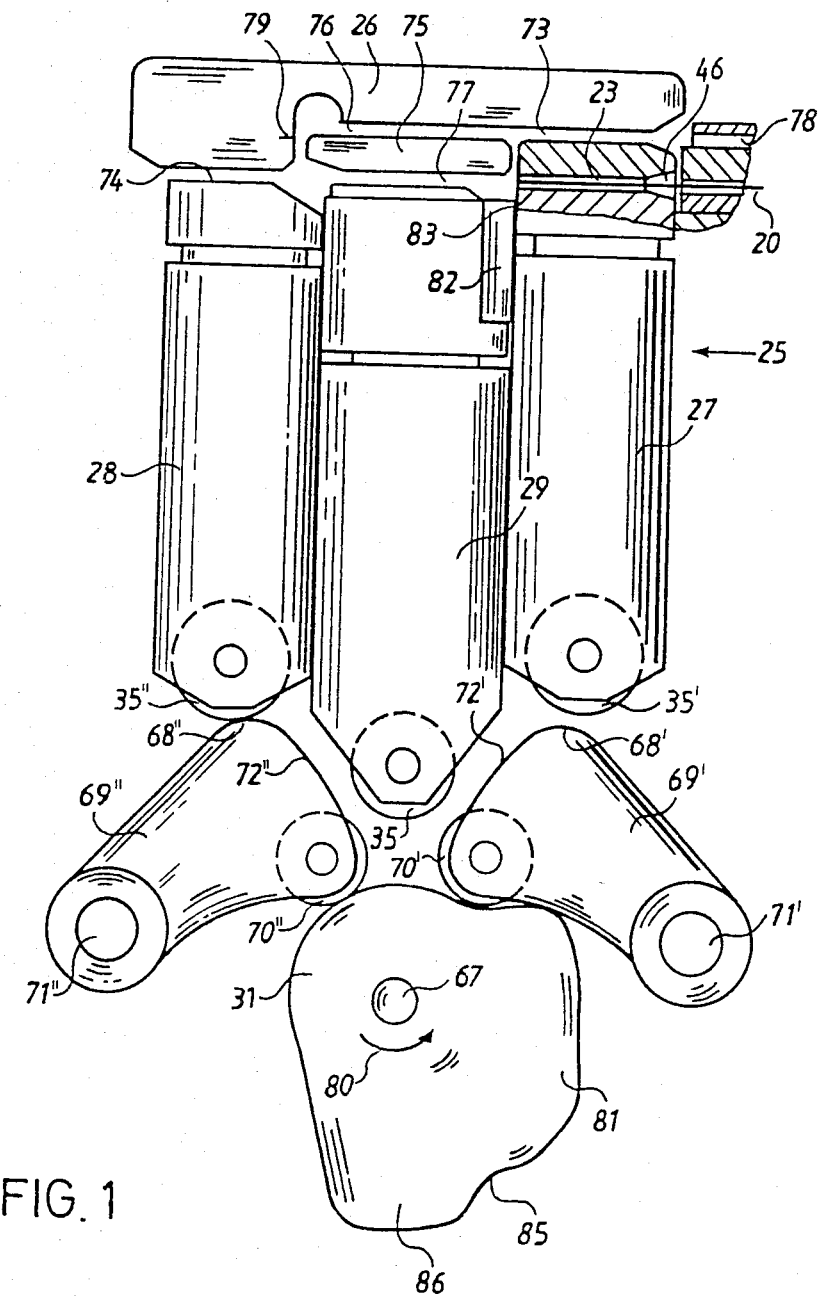

United States Patent [19]

Bartzick et al.

[11] Patent Number: 4,527,379

[45] Date of Patent: Jul. 9, 1985

[54] APPARATUS FOR CONNECTING OVERLAPPING ENDS OF A STRAPPING BAND TENSIONED ABOUT A PACKAGE

[75] Inventors: Günter Bartzick, Ennepetal; Gerd Bühne, Schwelm; Reinhard Naydowski, Remscheid, all of Fed. Rep. of Germany

[73] Assignee: Hoesch Werke Aktiengesellschaft, Dortmund, Fed. Rep. of Germany

[21] Appl. No.: 498,245

[22] Filed: May 26, 1983

[30] Foreign Application Priority Data

May 29, 1982 [DE] Fed. Rep. of Germany ....... 3220445

[51] Int. Cl.³ .............................................. B65B 13/32
[52] U.S. Cl. ....................................... 53/589; 53/582; 100/29; 100/33 PB
[58] Field of Search .................. 53/582, 589; 100/29, 100/30, 33 PB

[56] References Cited

U.S. PATENT DOCUMENTS 3,914,153 10/1975 Sato ............................ 53/198 R X
4,112,839 9/1978 Büttner ........................... 100/33 PB
4,218,969 8/1980 Kasuga ....................... 100/33 PB X Primary Examiner—Paul A. Bell
Attorney, Agent, or Firm—Max Fogiel

[57] ABSTRACT

Apparatus for tensioning a plastic strapping band positioned around a package and for connecting the overlapping ends of the band by hot bonding consisting of a fastening mechanism for hot bonding the overlapping ends of the band and including a backing plate, between the band and the package, against which three plungers aligned along the longitudinal axis of the band can be applied, the first plunger securing the free front end of the band, the second plunger securing the rear end of the band, and the third, middle, plunger forcing the overlapping ends of the band against a hot-bonding mechanism in the form of a heated cutter and compressing the molten ends together. The three plungers (27, 28, 29) aligned along the longitudinal axis of the band (20) are activated with a single cammed disk (31) on a shaft (67) perpendicular to the longitudinal axis of the band.

23 Claims, 15 Drawing Figures

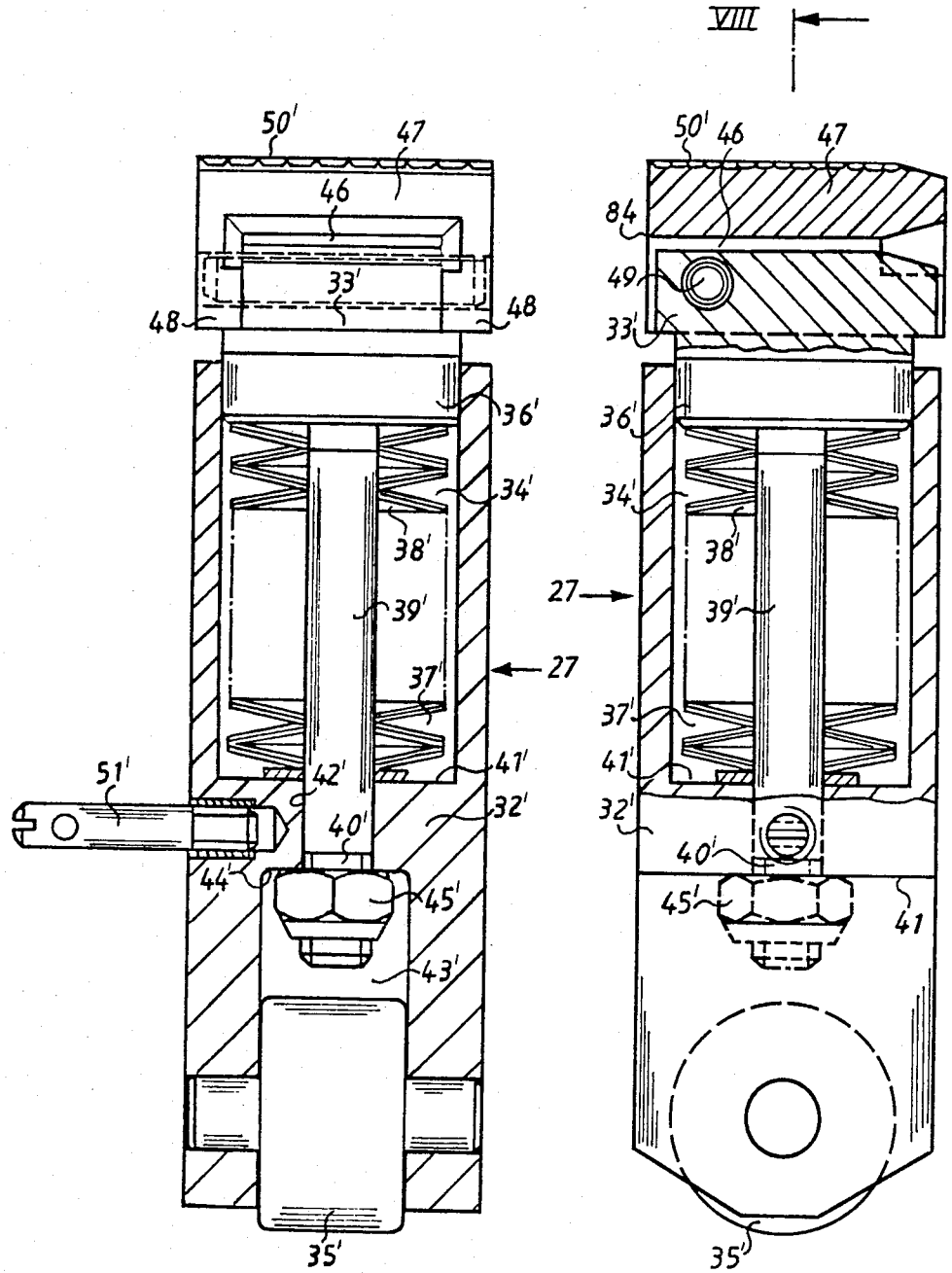

APPARATUS FOR CONNECTING OVERLAPPING ENDS OF A STRAPPING BAND TENSIONED ABOUT A PACKAGE

The invention concerns apparatus for tensioning a plastic strapping band obtained from a supply reel and positioned around a package, for connecting the overlapping ends of the band by hot bonding, and for cutting off the length of band leading from the supply reel and not utilized in wrapping, apparatus consisting of a mechanism for advancing and tensioning a strapping band that is initially advanced in a band guide surrounding but not in contact with the package to be wrapped and subsequently drawn back into a position in contact with the package while the front end of the band is held in place and then tensioned and of a fastening mechanism for hot bonding the overlapping ends of the band and including a backing plate, between the band and the package, against which three plungers aligned along the longitudinal axis of the band can be applied, the first plunger securing the free front end of the band, the second plunger securing the rear end of the band, and the third, middle, plunger forcing the overlapping ends of the band against a hot-bonding mechanism in the form of a heated cutter, compressing the molten ends together, and cutting off the length of the strapping band leading from the supply reel and not utilized in wrapping.

Each of the three plungers in a known apparatus of this type is activated by an individual cammed disk mounted on a common shaft that parallels the longitudinal axis of the band. The fact that the shaft parallels the axis of the band necessitates considerable space under the fastening mechanism because the drive motor also has to be mounted on one end of the same shaft, which also affects the position of the advance and tensioning mechanism, which has to be as near the fastening mechanism as possible.

The present invention is intended as apparatus of the aforesaid type that lacks these drawbacks and in which the three plungers are powered in a way that necessitates little space without having a deleterious effect on their operation.

This objective in achieved in accordance with the invention in that the three plungers aligned along the longitudinal axis of the band are activated with a single cammed disk on a shaft perpendicular to the longitudinal axis of the band. Since activating the three plungers with a single cammed disk on a shaft parallel to the longitudinal axis of the band necessitates little space under the fastening mechanism, the advance and tensioning mechanism can be positioned very near the fastening mechanism.

The middle plunger can directly engage the cammed disk through a contact roller, while each of the two other plungers engages through its own contact roller the contours of pivoting positioning levers, each of which in turn engages the cammed disk along its circumference at a point displaced from the contact roller of the middle plunger.

The middle plunger's immediate contact with the cammed disk and the mediation of pivoting positioning levers between the cammed disk and the two outer plungers is a simple means of activating all three plungers with one disk.

The middle plunger, which directly engages the cammed disk through a contact roller can be positioned relative to the disk in such a way that the projected longitudinal axis of the plunger intersects the axis of rotation of the shaft of the disk.

The contours of the disk will accordingly directly displace the middle plunger.

One of the two positioning levers can be positioned in relation to its pivot and contact roller, which operates in conjunction with the cammed disk, so that the curved line of contact of the contact roller against the cammed disk precedes the point of contact of the middle plunger along the circumference of the cammed disk at an angle of approximately 28° and the second positioning lever follows the point of contact of the middle plunger at the same angle.

The contact rollers of the middle plunger and both positioning levers will accordingly be positioned each in relation to the others so as to rest separated against the circumference of the cammed disk.

Each pivoting positioning lever can have a contour that relates to its associated plunger in such a way as to displace the plunger and that merges into a contour concentric with its pivot.

This is a simple means of ensuring that the rising contour of a positioning lever will displace the plunger when the cammed disk pivots the positioning lever out of the starting position, in which the contact rollers on the positioning lever rests against the lowest section of the cammed disk, only while the pivoting motion is being initiated, whereas, as the positioning lever continues to pivot, the contact roller on the associated plunger will engage the contour of the positioning lever that is concentric with its pivot and the displacement of the plunger will terminate.

The cammed disk can accordingly have elevations that do not displace a plunger activated through the mediation of a positioning lever. These elevations on the cammed disk that do not displace a plunger activated by a positioning lever can activate the middle plunger independently. Thus, the cammed disk has elevations that, although they do pivot the positioning levers, do not affect a plunger activated by a positioning lever and hence activate only the middle plunger. The middle plunger can simultaneously be positioned in relation to the cammed disk in such a way as to be displaced by only some of the elevations on the cammed disk that extend above the elevations on the cammed disk that affect a plunger activated by a positioning lever.

Springs can be assigned to the three plungers to non-positively position the contact rollers on the plungers against the cammed disk.

This is a simple means of holding the plungers in place.

Each of the three plungers can be in two parts and the part with the contact roller and the part that comes to rest against the strapping band are displaced from each other to an extent limited by the force of a prestressed accumulator.

Since the part of the plunger that comes to rest against the strapping band will therefore come to rest against it non-positively, manufacturing tolerances and the tolerances of the band can be compensated when the parts are forced against the band.

The accumulator can be a package of cup springs. Cup springs have sufficient tensioning force and are simple to prestress.

A screw can extend through the package of cup springs that makes up the accumulator in each of the plungers that secure the ends of the strapping band to hold the part with the contact roller and the part that comes to rest against the strapping band apart at a predetermined distance and to determine the level of prestressing. It is simple to prestress the cup springs with a screw that also holds the two parts of a plunger together.

The front surface, which faces away from the contact roller, of the part that has the contact roller of each plunger that secures an end of the band can have a recess that accommodates the package of cup springs and in which an inset carrier on the part that comes to rest against the strapping band telescopes. This is a simple means of accommodating a package of cup springs inside each plunger, with the recess that accommodates the package of cup springs also controlling the displacement of the inset carrier on the other part of the plunger.

The screw that holds the two parts of a plunger that secures one end of the strapping band can be a pin with a thread, cast in one piece with the free face of the carrier on the part of the plunger that comes to rest against the band, its free end extending through a perforation in the bottom of the recess that accommodates the package of cup springs into a slot-like space for the contact roller and carrying a nut that comes to rest against the bottom of the slot-like space for the contact roller. This threaded pin is a simple means of fastening the two parts of a plunger together and the nut can simultaneously appropriately prestress the package of cup springs that the pin extends through.

The plunger that secures the free front end of the strapping band can have a slot for the band to extend through and consisting of a cap with a U-shaped cross-section and held in place on the part of the plunger facing the band with a dowel pin through one leg, its free face forming a contact and securing surface for the free front end of the strapping band. This slot in the plunger that secures the free front end of the strapping band is necessary if the band is to be advanced and, once its free front end has been secured, drawn back into position around the package and tensioned. Manufacture and assembly can be simplified if the slot is a cap with a U-shaped cross-section. These parts are especially simple to manufacture and fasten together with a dowel pin.

The part of the middle plunger, which forces the overlapping ends of the band against the hot-bonding mechanism in the form of a heated cutter and compresses the molten ends together, that faces the strapping band can have a catch with a T-shaped cross-section that engages a T-shaped groove in the part of the plunger with the contact roller and accordingly permits the two parts to be compressed together along the axis of the plunger to an extent limited by the force of the accumulator. The two parts of the plunger for the front end of the strapping band can accordingly easily be non-positively fastened together by means of the T-shaped catch and T-shaped groove in a way that allows the two parts to be compressed together to an extent limited by the force of the accumulator.

A pin cast in one piece with a piston can extend through the package of cup springs that makes up the accumulator in the plunger for the front end of the strapping band, with the piston housed along with the package of cup springs in a recess in the part with the contact roller and, subject to the force of the cup springs, resting against the free face of the T-shaped catch in the part of the plunger that faces the strapping band. The two parts of the middle plunger that are fastened together with a T-shaped catch and a T-shaped groove are accordingly separated by the piston, which is subject to the force of the accumulator. The package of cup springs that make up the accumulator are then positioned on the pin cast in one piece with the piston.

The free end of the pin cast in one piece with the piston and extending through the package of cup springs can slide in a perforation in the bottom of the recess that accommodates the package of cup springs. This is a simple means of preventing the pin and hence the piston from getting jammed due to tilting.

The part of the middle plunger that faces the strapping band can have a T-shaped groove in the surface that faces the strapping band that is engaged by a contact part with a more or less T-shaped cross-section and that can be forced in to an extent limited by the force of a spring. The middle plunger accordingly also has a special contact part that can be forced in to a limited extent and rests against flat the strapping band that is to be secured in accordance with the invention.

The bottom of the contact part of the middle plunger can have a vaulted seating that accepts the convex head of a spring-loaded tappet. This means of supporting the contact part of the middle plunger also allows the contact part to tilt to adjust to any irregularities in strapping band. The contact part of the middle plunger will always lie in accordance flat against the strapping band.

The spring-loaded tappet can have a pin in back of its convex head on which a helical compression spring is mounted with one end resting against the rear of the convex head and the other against the bottom of a recess that guides the head. The helical compression spring is thus simple to mount on the pin in back of the convex head and will reliably maintain the head in position against the contact part of the middle plunger.

The free end of the pin in back of the convex head of the spring-loaded tappet can slide in a perforation in the bottom of the recess that accommodates the helical compression spring, with the pin coming to rest against the spring-loaded piston of the two parts of the middle plunger when forced in. This is a simple means of preventing the pin and hence the convex head from tilting and limiting the extent to which the contact part is forced in.

The shaft, which is perpendicular to the longitudinal axis of the strapping band, of the cammed disk that activates the three plungers can also support a cylindrical cam that inserts and retracts the hot-bonding mechanism, consisting of the heated cutter, perpendicular to the longitudinal axis of the band. Making the shaft of the cammed disk that activates the three plungers also support the cylindrical cam that inserts and retracts the hot-bonding mechanism simplifies the design.

The shaft of the cammed disk can also support another cylindrical cam that inserts and retracts a bolt that holds the overlapping ends of the strapping band apart. Thus, it is very simple for the shaft not only to activate the three plungers but also to activate by means of another cammed disk the bolt that holds the overlapping ends of the strapping band apart while the band is being advance, pulled back, and tensioned.

The shaft, which is perpendicular to the longitudinal axis of the strapping band, of the cammed disk that activates the three plungers can also be parallel to the shafts of the drive wheels of a nearby mechanism for advancing and tensioning the band. Thus, the shafts of the fastening mechanism and of the advance and tensioning mechanism can easily be positioned very close to each other, keeping the overall design very compact.

Figure 2:
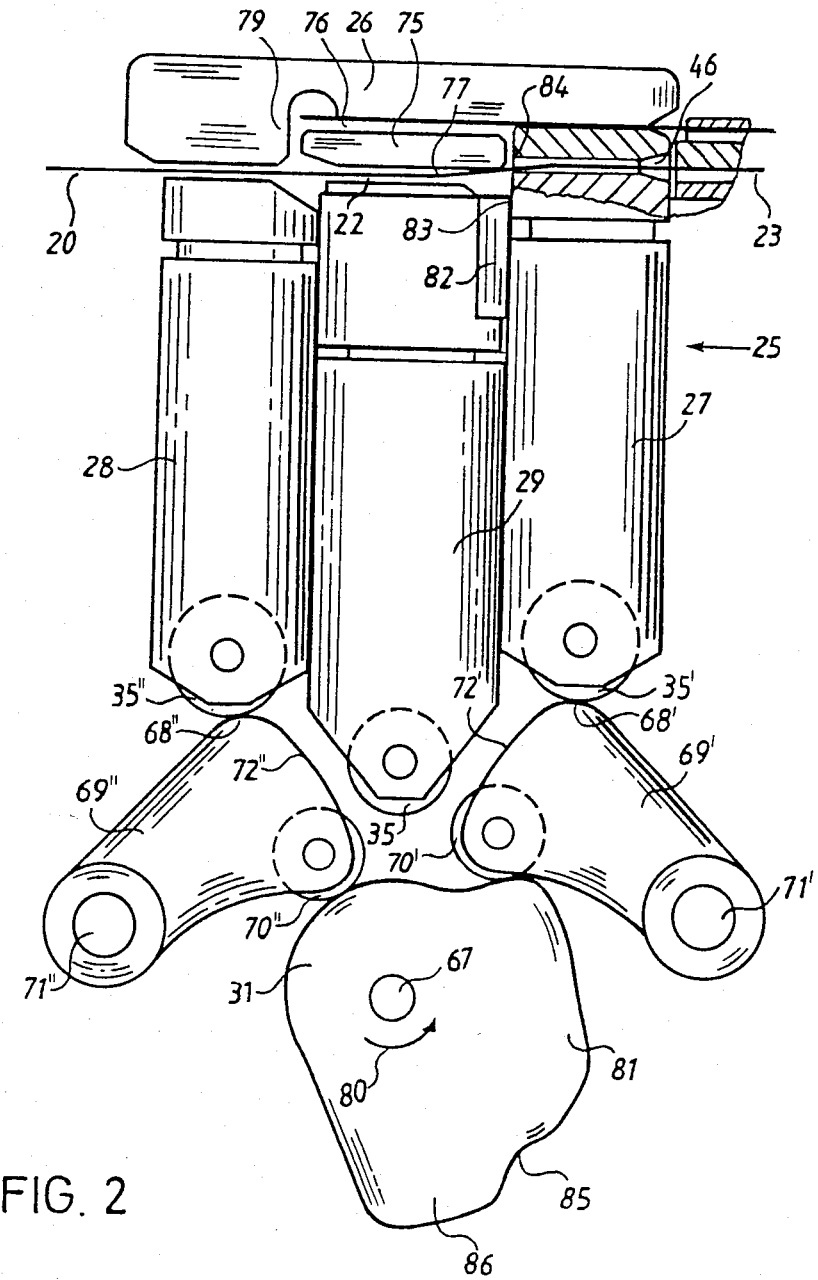
Figure 3:
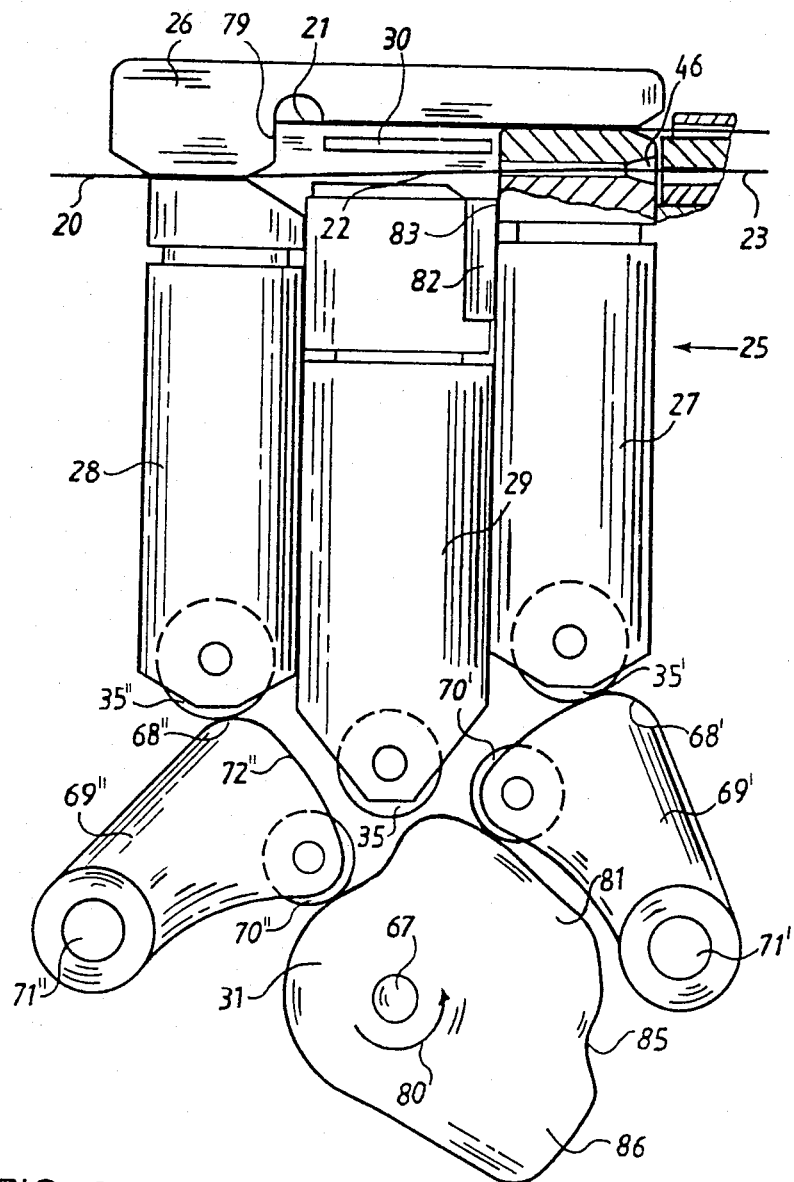
Figure 4:
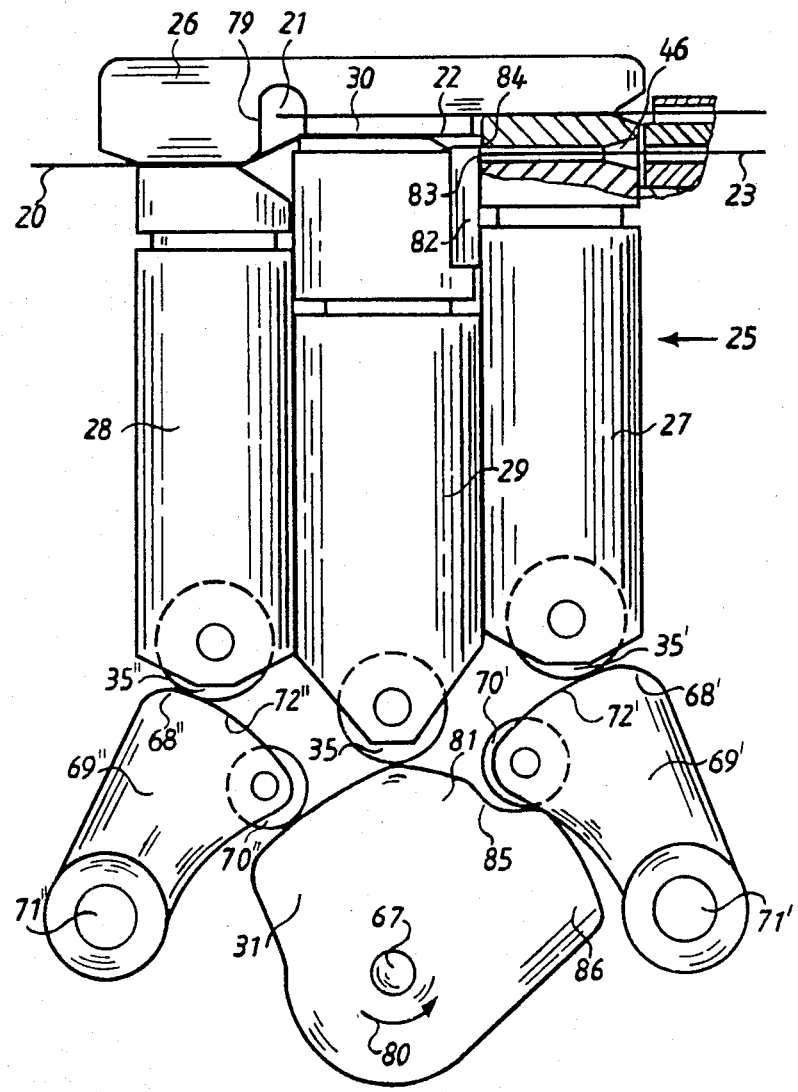
Figure 5:
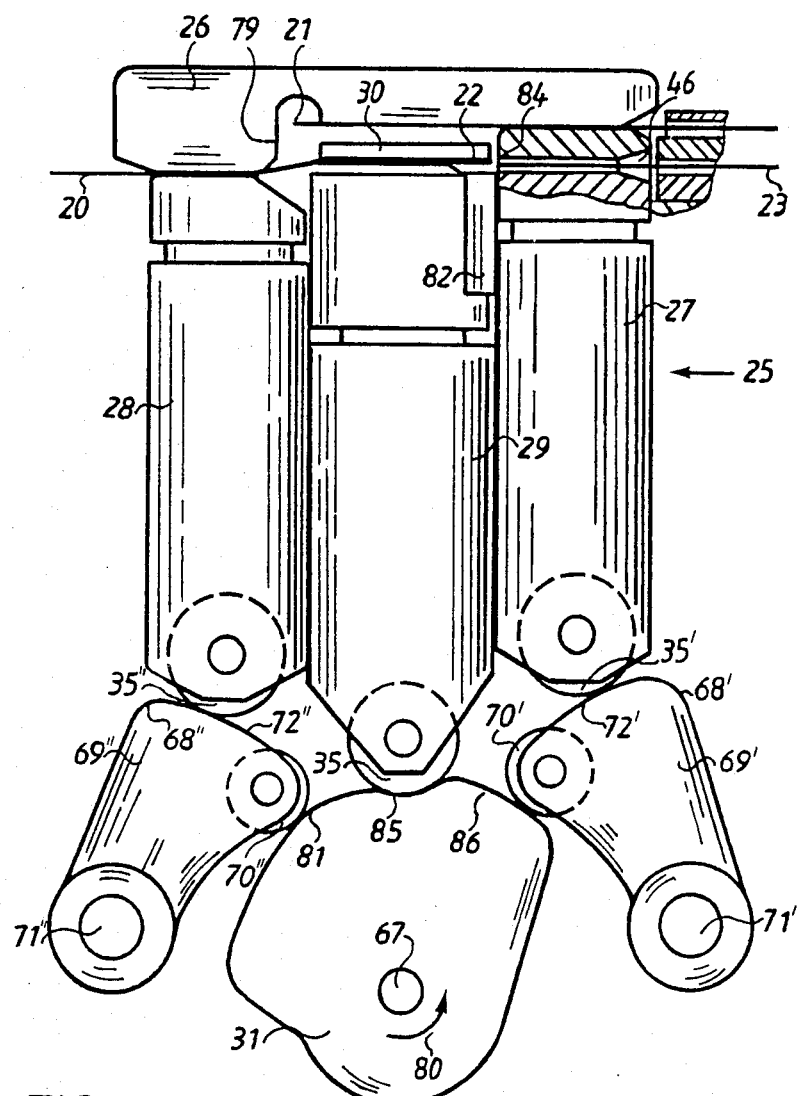
Figure 6:
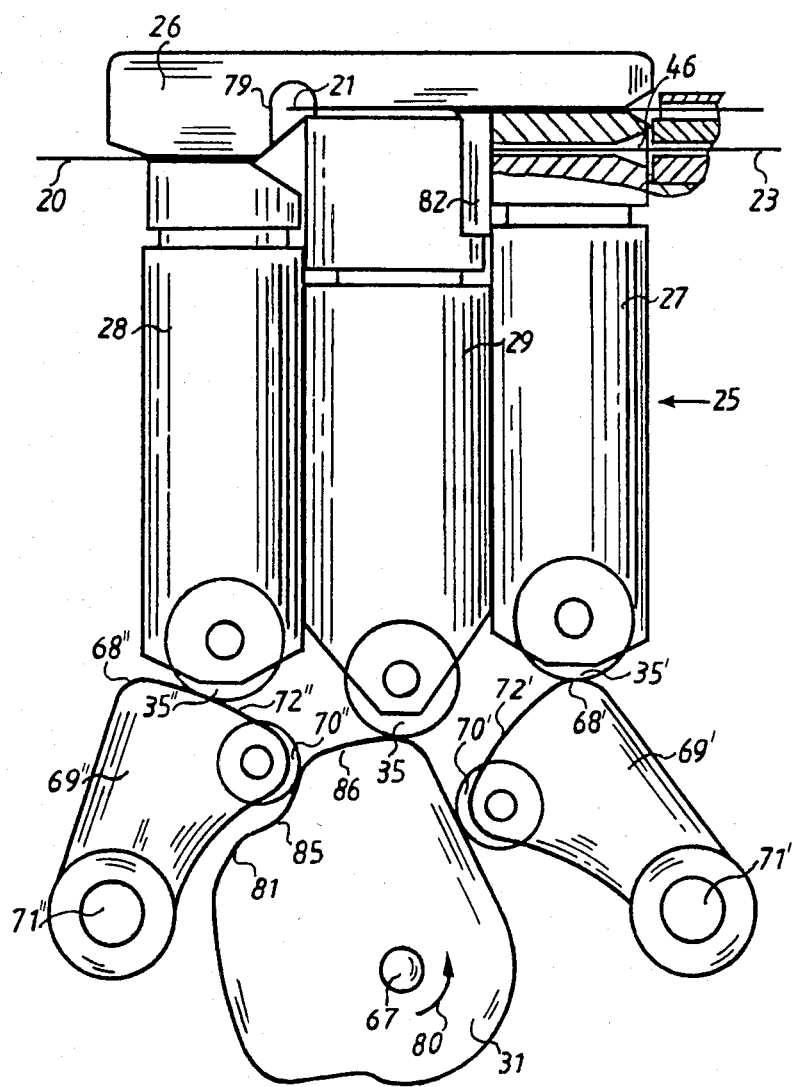
Figures 9, 10:
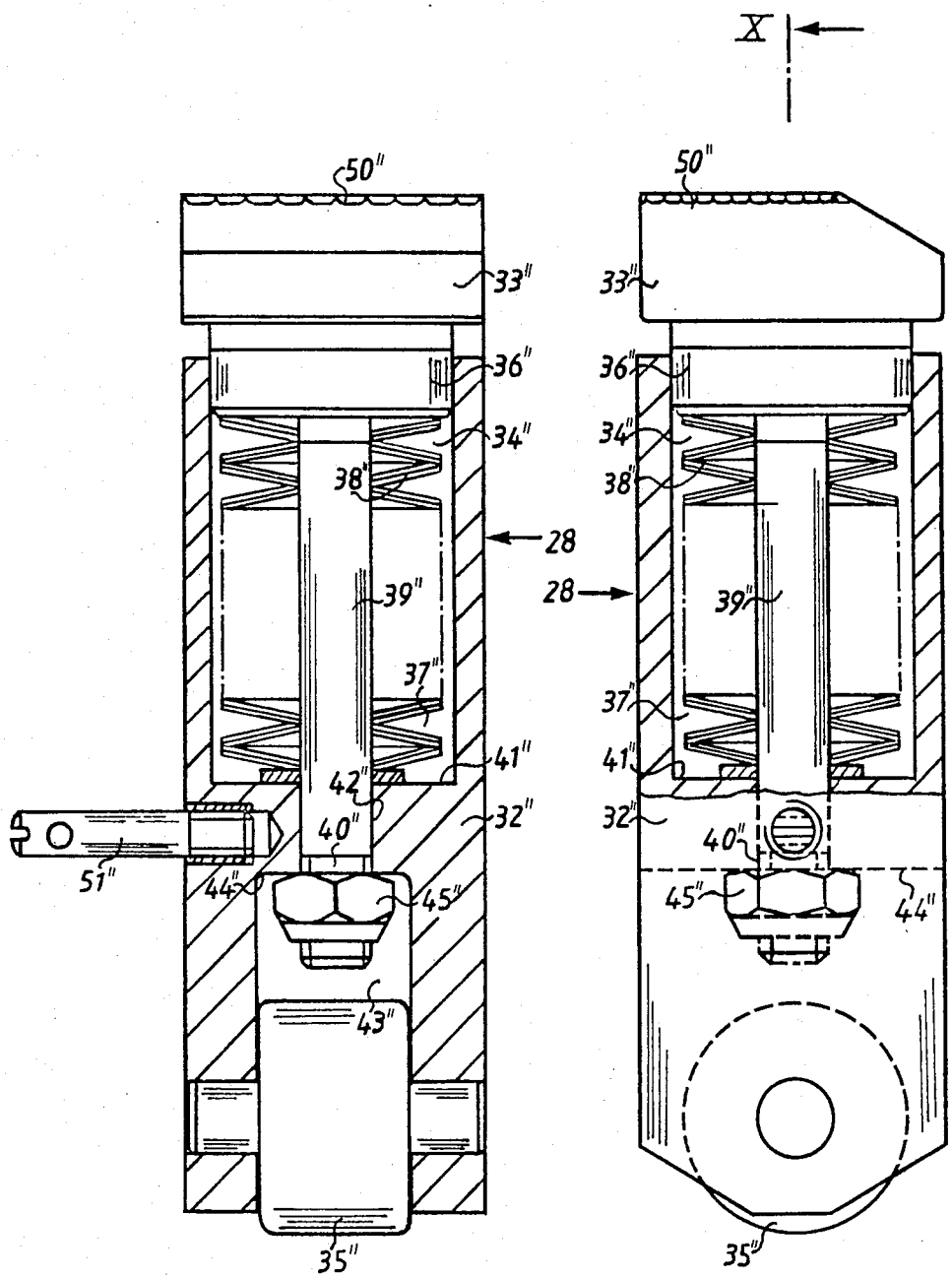
Figures 11, 12:
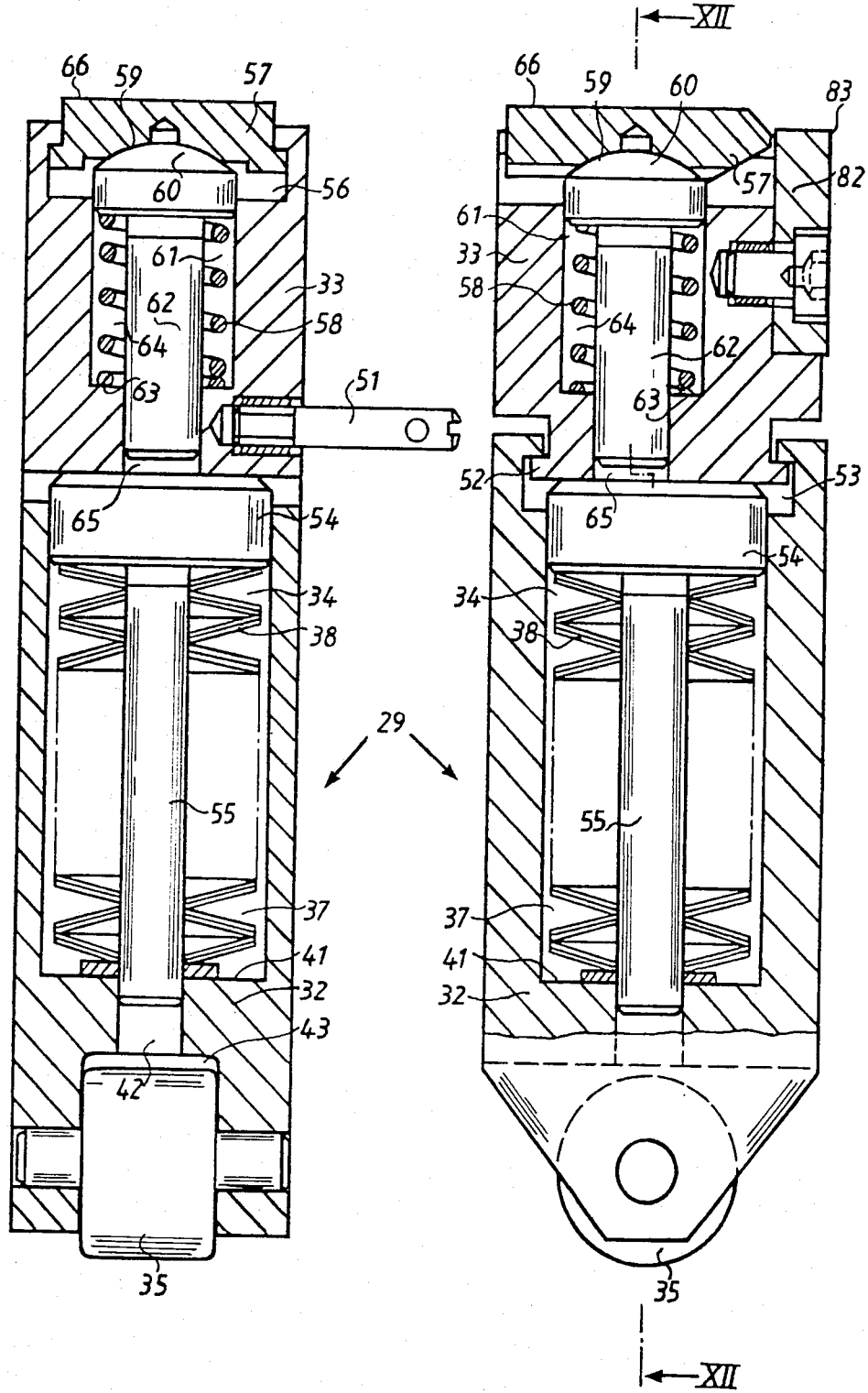
Figure 13:
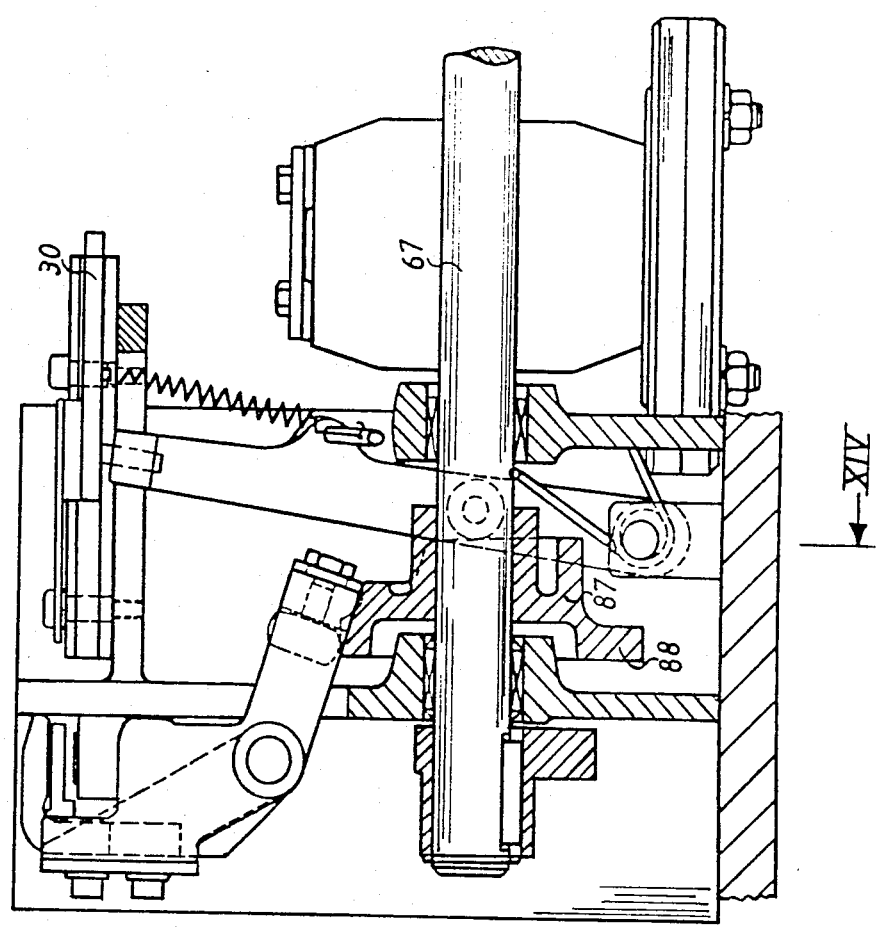
Figure 14:
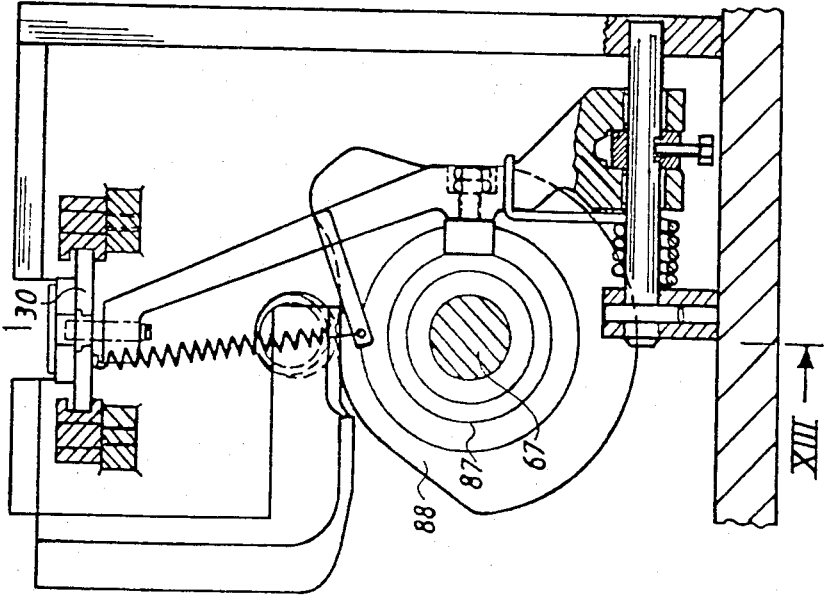
Figure 15:
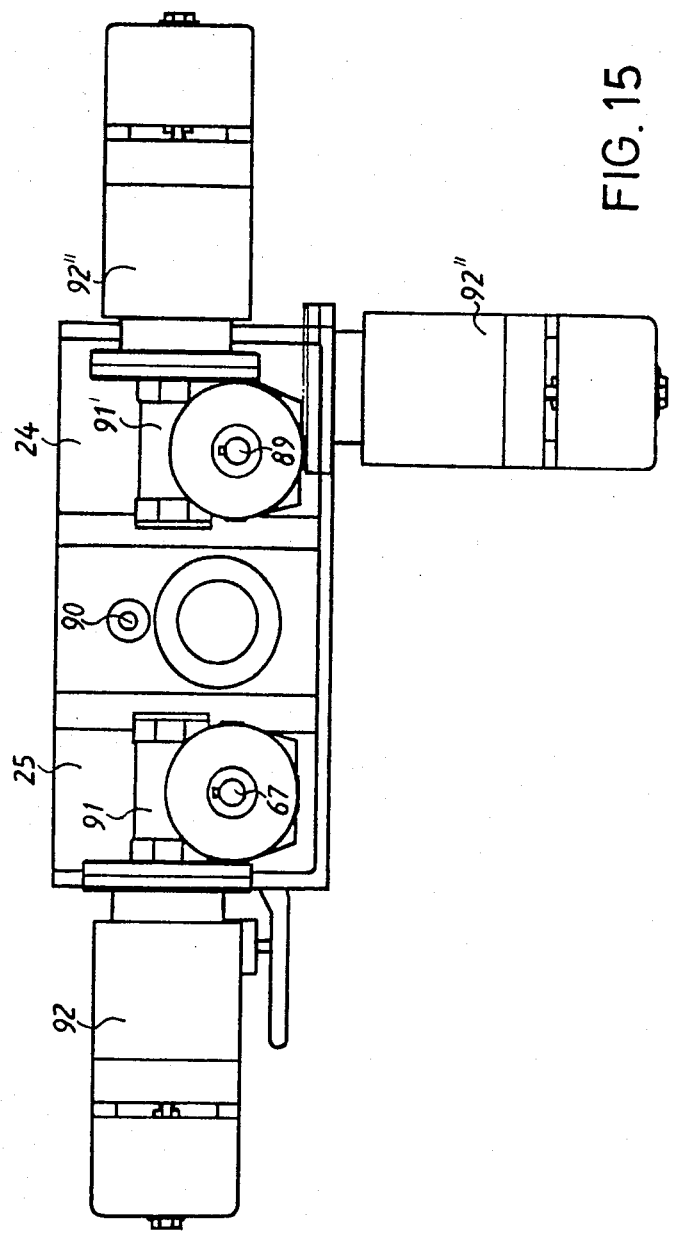

One embodiment of the invention will now be specified by way of example with reference to the drawings, in which FIG. 1 is a schematic illustration of the device in accordance with the invention in the position in which the strapping band can be advanced, FIG. 2 is a schematic illustration of the device in the position in which the free front end of the band has been secured, FIG. 3 is a schematic illustration of the device in the position in which both ends of the band have been secured, FIG. 4 is a schematic illustration of the device in the position in which the heated cutter has been introduced and both ends of the band forced against it, FIG. 5 is a schematic illustration of the device in the position in which both ends of the band have been separated from the heated cutter, FIG. 6 is a schematic illustration of the device in the position in which both molten ends of the band have been pressed together, FIG. 7 is a partial section viewed from the side of the plunger that secures the free front end of the band, FIG. 8 is a section along the line VIII—VIII in FIG. 7, FIG. 9 is a partial section viewed from the side of the plunger that secures the other end of the band, FIG. 10 is a section along the line X—X in FIG. 9, FIG. 11 is a partial section viewed from the side of the middle plunger, FIG. 12 is a section along the line XII—XII in FIG. 11, FIG. 13 is a section along the line XIII—XIII in FIG. 14 of the hot-bonding device consisting of a heated cutter and its drive mechanism, FIG. 14 is a section along the line XIV—XIV in FIG. 13, and FIG. 15 is a rear view of the advance and tensioning mechanism and sealing mechanism.

The device illustrated in the drawings is employed to tension a plastic strapping band 20, obtained from a supply reel that is not illustrated and wrapped around a package that is not illustrated, to secure the overlapping ends 21 and 22 of the band by hot bonding, and to cut off the length 23 of band not wrapped around the package but leading from the supply reel. The device consists of a mechanism 24, which is in itself known and will not be described in detail, for advancing and tensioning strapping band 20, which is initially advanced in a band guide that is not illustrated, surrounding but not in contact with the package to be wrapped and subsequently, once the free front end 21 of the band has been secure, drawn back into a position in which it contacts the package and then tensioned. The device also has a fastening mechanism 25 for hot-bonding the overlapping ends 21 and 22 of the band together. Fastening mechanism 25 has a backing plate 26 positioned between strapping band 20 and the package and a series of three plungers 27, 28, and 29 that can be forced against the plate.

One plunger 27 secures the free front end 21 of the band, the second 28 secures the other end 22 of the band, and the third 29, which is positioned between the other two, forces the overlapping ends 21 and 22 of the band against a hot-bonding mechanism in the form of a heated cutter 30, presses together the molten ends 21 and 22, and cuts off the excess length 23 leading from the supply reel. Plungers 27, 28, and 29 are activated, as will be described later herein, with a single cammed disk 31.

FIGS. 7 and 8 illustrate plunger 27, which secures the free front end 21 of the band. Plunger 27 consists of two parts 32' and 33' that can be compressed to a limited extent in opposition to the force of a prestressed accumulator 34'. There is a contact roller 35' on the free end, which faces a cammed disk 31, of part 32' of plunger 27. Part 33' of plunger 27 faces the end 21 of the band that is to be secured and has a inset carrier 36' that telescopes into a corresponding recess 37' in the part 32' of plunger 27 on which contact roller 35' is mounted. Recess 37' in part 32' of plunger 27 also accommodates the accumulator 34', which consists of a package of cup springs 38'.

A pin 39' is mounted on the free face of inset carrier 36' in the part 33' of plunger 27 that comes into contact with strap 10. The free end of pin 39' is threaded with threads 40'. The free end of pin 39' projects through a perforation 42' in the bottom 41' of the recess 37' that accommodates the package of cup springs 38' and extends into a slot-like space 43' that houses contact roller 35'. A lock nut 45' that comes to rest against the bottom 44' of the slot-like space 43' that houses contact roller 35' is screwed onto the threads 40' of pin 39'. The prestressing of the accumulator 34' that consists of a package of cup springs 38', and hence the length of plunger 27, can be adjusted by turning nut 45'.

The length 23 of strapping band 20 that leads from the supply reel runs through a slot 46 in the plunger 27 that secures the free front end 21 of the band. Slot 46 allows the band to be drawn back and tensioned once its free front end 21 has been secured by plunger 27. Slot 46 is made up of the distance between part 33' of plunger 27 covered by a cap 47 with a U-shaped cross-section. Cap 47 is held in place on part 33' with a dowel pin 49 through its leg 48 and its free front end forms a contact and securing surface 50' for the free front end of strapping band 20.

As will be particularly evident from FIG. 8, there is a pin 51' in the side of plunger 27. Pin 51' serves as a support for a spring that is not illustrated and that stresses plunger 27 to restore it to its base position.

FIGS. 9 and 10 illustrate the second plunger 28 that secures the other end 22 of the band in greater detail. The design of second plunger 28 is essentially similar to that of the first plunger 27 illustrated in FIGS. 7 and 8 and reference is made to its description. Second plunger 28 has no slot 48, however and contact and securing surface 50' is directly integrated into the part 33' of plunger 28 that faces strapping band 20.

FIGS. 11 and 12 illustrate the third plunger 29, which is positioned between plungers 27 and 28 and which forces the overlapping ends 21 and 22 of the band against the hot-bonding device in the form of a heated cutter 30, presses the molten ends 21 and 22 of the band together, and cuts of the length 23 leading back to the supply reel. Plunger 29 also consists of two parts 32 and 33. Part 32, which houses a contact roller 35, and part 33, which comes into contact with strapping band 20, can be displaced toward each other to an extent limited by the force of a prestressed accumulator 34. Here again, accumulator 34 is a package of cup springs 38.

The part 33 that faces strapping band 20 has a catch 52 with a T-shaped cross-section that engages a T-shaped groove 53 in the part 32 that houses contact roller 35. This particularly facilitates assembly. T-shaped catch 52 and T-shaped groove 53 are designed to allow the two parts 32 and 33 to be pressed together longitudinally in plunger 29 to an extent limited by the force of accumulator 34.

A pin 55 cast in one piece with a piston 54 extends through the package of cup springs 38 that makes up accumulator 34. Piston 54 is housed along with cup springs 38 in a recess 37 in part 32. Piston 54, which is subject to cup springs 38, rests against the free face of the T-shaped catch 52 in the part 33 of plunger 29 that faces strapping band 20. The free end of the pin 55 that is cast in one piece with piston 54 and extends through the package of cup springs 38 slides in a perforation 42 in the bottom 41 of the recess 37 that houses the package of cup springs 38. Piston 54, which is subject to cup springs 38, accordingly slides along with pin 55 in recess 37 and perforation 42.

In comparison with plungers 27 and 28, the face of the part 33 of middle plunger 29 that faces strapping band 20 has a T-shaped groove 56 that is engaged by a contact part 57 with a more or less T-shaped cross-section that can be pressed in to a an extent limited by the force of a spring 58. The bottom of the contact part 57 of middle plunger 29 has a vaulted seating 59 that accepts the convex head 60 of a spring-loaded tappet 61. Spring-loaded tappet 61 has a pin 62 in back of convex head 60 over which the helical compression spring 58 fits. One end of pin 62 rests against the back of convex head 60 and the other against a recess 64 that guides the head. The free end of the pin 62 in back of convex head 60 slides in a perforation 65 in the bottom 63 of the recess 64 that houses spring 58.

Thus, when middle plunger 29 is forced against strapping band 20, the contact and securing surface 66 of contact part 57 will always lie flat against strapping band 20 because it will adjust to the surface of the band. Since, however, the spring resistance of helical compression spring 58 is weaker than that of the package of cup springs 38, spring 58 will initially be compressed when plunger 29 is forced against strapping band 20 until the free end of the pin 62 on convex head 60 slides through perforation 65 and comes to rest against piston 54. Only then, as force continues to be applied, will the package of cup springs 38 be compressed.

As explained in the foregoing, all three plungers 27, 28, and 29, which are positioned in sequence parallel to strapping band 20, are activated with a single cammed disk 31. The shaft 67 of cammed disk 31 is perpendicular to the longitudinal axis of strapping band 20. FIGS. 1 through 6 illustrated how the three plunger 27, 28, and 29 are activated. As will be evident from these drawings, cammed disk 31 directly engages the contact roller 35 of middle plunger 29, whereas the contact roller 35' and 35" of the other two plungers 27 and 28 rest against the contours 68' and 68" of pivoting positioning levers 69' and 69". Pivoting positioning levers 69' and 69" engage cammed disk 31 through contact rollers 70' and 70" and are circumferentially displaced in relation to the contact roller 35 of middle plunger 29.

Middle plunger 29, which directly engages cammed disk 31 through its contact roller 35, is positioned in relation to cammed disk 31 in such a way that the projected longitudinal axis of plunger 29 intersects the axis of rotation of the shaft 67 of cammed disk 31. Thus, the elevations on cammed disk 31 will directly displace middle plunger 29.

One of the two pivoting positioning levers 69" is positioned with its pivot 71" and with its contact roller 70", which operates in conjunction with cammed disk 31, in such a way that the curved line of contact between its contact roller 70" and cammed disk 31 will precede the point of contact of middle plunger 29 at an angle of about 28° along the circumference of cammed disk 31, whereas second positioning lever 69' will follow the point of contact of middle plunger 29 at the same angle. Contact rollers 35 and 70' and 70" of middle plunger 29 and pivoting positioning levers 69' and 69" can therefore unimpededly engage cammed disk 31.

Pivoting positioning levers 69' and 69" each have a contour 68 that will displace its associated plunger 27 or 28 when its contact roller 35', 35" is applied. Contours 68' and 68" merge into a contour 72' and 72" that is concentric with pivot 71' and 71". When cammed disk 31 pivots one of the positioning levers 69' and 69", the associated plunger 27 or 28 will be displaced only as long as the contact roller 35' and 35" of plunger 27 or 28 engages the contour 68' and 69" of pivoting positioning lever 69. As soon as the contact roller 35', 35" of plunger 27 or 28 engages the contour 72', 72" of pivoting positioning levers 69' and 69", the displacement of plunger 27 or 28 will cease. Cammed disk 31 can therefore have elevations that will only activate middle plunger 29 and will make pivoting positioning levers 69' and 69" idle when in engaging contact rollers 70', 70".

FIG. 1 illustrates fastening mechanism 25 in the base position. There is a gap 73 between the backing plate 26 and the contact and securing surface 50' of plunger 27. There is another gap 74 between the backing plate 26 and the contact and securing surface 50" of plunger 28. There is a bolt 75 between the backing plate 26 and the contact and securing surface 66 of middle plunger 29. Bolt 75 holds the overlapping ends 21 and 22 of the band apart. There is another gap 76, however, between backing plate 26 and bolt 75 and still another gap 77 between bolt 75 and the contact and securing surface 66 of plunger 29. In this position of fastening mechanism 25, advance and tensioning mechanism 24 can initially advance strapping band 20 in a band guide surrounding but not in contact with the package to be wrapped. As a result of the previous wrapping operation, however, the length 23 of strapping band 20 leading from the supply roll still remains in the slot 46 in plunger 27. Length 23 now becomes the free front end 21 of strapping band 20 that will be utilized for the next wrapping operation and can be advanced through gaps 77 and 74 and then through the band guide surrounding but not in contact with the package until it arrives again in fastening mechanism 25 through guide slot 78, also extending through gaps 73 and 76 and with its free front surface coming into contact with an inset shoulder 79 on backing plate 26. This terminates the advance of strapping band 20.

Rotating cammed disk 31 around its shaft 67 in the direction indicated by arrow 80 causes plunger 27 to secure the front end 21 of strapping band 20. FIG. 2 illustrates this position of fastening mechanism 25. Strapping band 20 can now be drawn back with advance and tensioning mechanism 24 until it comes to rest against the package. The band is subsequently tensioned, also with advance and tensioning mechanism 24. Once strapping band 20 has been tensioned, its rear end 22 is secured with plunger 28 by continuing to rotate cammed disk 31 in the direction indicated by arrow 80. FIG. 3 illustrates fastening mechanism 25 in this position. Once the rear end 22 of strapping band 20 has been secured, bolt 75 is extracted laterally between the overlapping ends 21 and 22 of the band and replaced with heated cutter 30. FIG. 3 illustrates heated cutter 30 already in place between overlapping ends 21 and 22.

Further rotation of cammed disk 31 around shaft 67 brings elevation 81 on cammed disk 31 into engagement with the contact roller 35 of middle plunger 29, displacing plunger 29 toward backing plate 26. This initially cuts off the length 23 of strapping band 20 leading from the supply reel and not to be employed in wrapping. This is done with a cutting insert 82 in middle plunger 29 with a cutting edge 83 that operates in conjunction with the cutting edge 84 on the cap 47 of plunger 27. Depending on the thickness and strength of the strapping band 20 that is to be cut, contact part 57 will initially be pressed against the force of spring 58 into part 33 of plunger 29 until the pin 62 of convex head 60 comes to rest against piston 54 and then parts 32 and 33 of plunger 29 will be pressed together against the force of accumulator 34 until part 33 comes to rest against part 32. Once strapping band 20 has been cut, springs 34 and 58 will restore parts 32, 33, and 57 to the base position illustrated in FIGS. 11 and 12.

Middle plunger 29 continues to be displaced to bring the overlapping ends 21 and 22 of the band into position against heated cutter 30, melting the sides of the overlapping ends that face cutter 30. FIG. 4 illustrates this position of fastening mechanism 25. Only the helical compression spring 58 associated with contact part 57 is slightly compressed while ends 21 and 22 are forced against heated cutter 30. The package of cup springs 38 is prestressed to such an extent that it can not be compressed at this stage.

Continued rotation of cammed disk 31 on shaft 67 brings the contact roller 35 of middle plunger 29 into a depression 85, displacing plunger 29 to some extent away from backing plate 26. FIG. 5 illustrates this position. Heated cutter 30 can now be removed from between the two overlapping ends of strapping band 20. Once heated cutter 30 has been extracted, cammed disk 31 continues to rotate, bringing the contact roller 35 of middle plunger 29 into engagement with the elevation 86 on cammed disk 31 and displacing plunger 29 toward backing plate 26 so that the molten sides of the overlapping ends 21 and 22 of the band are compressed together. FIG. 6 illustrates fastening mechanism 25 in this position. While the overlapping ends are being compressed together, contact part 57 is initially displaced against the force of helical compression spring 58 into part 33 of plunger 29 until the pin 62 on convex head 60 comes to rest against piston 54. Part 33 of plunger 29 is then also displaced against the force of the package of cup springs 38 in part 32 of plunger 29, although part 33 does not come to rest against part 32. The joined molten sides of the overlapping ends of strapping band 20 will now cool provide a reliable bond. Cammed disk 31 continues to rotate until fastening mechanism 25 returns to the base position illustrated in FIG. 1.

As will be evident from FIGS. 13 and 14, the shaft 67 of cammed disk 31 is perpendicular to the longitudinal axis of strapping band 20 and there is a cylindrical cam 87 on shaft 67. Cylindrical cam 87 inserts and retracts the hot-bonding mechanism consisting of heated cutter 30 perpendicular to the longitudinal axis of the band. There is another cammed disk 88 on the shaft 67 of cammed disk 31. Cammed disk 88 inserts and retracts the bolt 75 that holds the overlapping ends of strapping band 20 apart. Thus, shaft 67 not only activates plungers 27, 28, and 29, but also inserts and extracts heated cutter 30 and bolt 75. The separate movements of bolt 75, cutter 30, and plungers 27, 28, and 29 can therefore easily be coordinated.

As explained above, shaft 67 is perpendicular to the longitudinal axis of strapping band 20 and hence, as will be evident in particular from FIG. 15, parallel to the shafts 89 and 90 of the drive wheels of the nearby advance and tensioning mechanism 24 so that fastening mechanism 25 and advance and tensioning mechanism 24 can be positioned very close to each other. The motors 92, 92″ which engage shafts 67 and 89 through an angle drive 91, 91′, can be mounted horizontal to keep the overall height as low as possible as illustrated in FIG. 15. It is also possible to mount motors 92, 93″ perpendicular to keep the overall width low. The dot-and-dash lines in FIG. 15 represent a perpendicular mounting.

As mentioned above, the embodiment described in only one example of how the invention can be constructed and the invention is not limited to that embodiment. Many other embodiments and versions are also possible.

We claim:

1. Apparatus for tensioning a plastic strapping band obtained from a supply reel and positioned around a package, for connecting overlapping ends of the band by hot bonding, and for cutting off a length of band leading from the supply reel and not utilized in wrapping, said apparatus comprising: a band guide; means for advancing and tensioning a strapping band that is initially advanced in said band guide, said band guide surrounding but not being in contact with the package to be wrapped and being subsequently drawn back into a position in contact with the package while a free end of the band is held in place and then tensioned; fastening means for hot bonding overlapping ends of the band; a backing plate between the band and the package; first, second and third plungers aligned along a longitudinal axis of the band and applicable against said backing plate, said first plunger securing the free front end of the band, said second plunger securing rear end of the band, said third plunger being a middle plunger forcing the overlapping ends of the band against hot-bonding means comprising a heated cutter compressing molten band ends together and cutting off a length of the strapping band leading from the supply reel and not utilized in wrapping, a single disk cam on a shaft perpendicular to the longitudinal axis of the band, said disk cam having a single cam contour track, said three plungers aligned along the longitudinal axis of the band being activated by said single disk cam.

2. Apparatus as defined in claim 1, including a contact roller, said middle plunger engaging directly said disk cam through said contact roller; pivoting positioning levers with contours, each of the two other plungers engaging through its own contact rollers the contours of said pivoting positioning levers, each of said positioning levers engaging in turn said disk cam along its circumference at a point displaced from said contact roller of said middle plunger.

3. Apparatus as defined in claim 2, wherein said middle plunger, which directly engages the disk cam through said contact roller is positioned relative to the disk cam so that the projected longitudinal axis of the middle plunger intersects the axis of rotation of said shaft carrying said disk cam.

4. Apparatus as defined in claim 2, wherein one of said two positioning levers is positioned in relation to its pivot and a second contact roller operating in conjunction with said disk cam, so that a curved line of contact of said second contact roller against said disk cam precedes a point of contact of said middle plunger along the circumference of said disk cam at an angle of substantially 28°, the other positioning lever following the point of contact of said middle plunger at the same angle.

5. Apparatus as defined in claim 2, wherein each pivoting positioning lever has a contuor relating to its associated plunger so as to displace the plunger, said contour merging into a contour concentric with its respective lever pivot.

6. Apparatus as defined in claim 2, including springs associated with said three plungers to non-positively position the contact rollers on the plungers against said disk cam.

7. Apparatus as defined in claim 2, wherein each of said three plungers is in two parts, one of said parts being associated with the contact roller and the other part resting against the strapping band, said parts being displaced from each other to an extent limited by the force of prestressed spring means.

8. Apparatus as defined in claim 7, wherein said other part of the middle plunger forcing the overlapping ends of the band against hot-bonding means has a catch with T-shaped cross-section engaging a T-shaped groove in said one part for permitting said two parts to be compressed together along an axis of the plunger to an extent limited by a force of said spring means.

9. Apparatus as defined in claim 7, wherein said other part of the middle plunger facing the strapping band has a T-shaped groove in a surface facing the strapping band; a spring; a contact part engaging said T-shaped groove and having a substantially T-shaped cross-section which can be forced in said T-shaped groove to an extent limited by the force of said spring.

10. Apparatus as defined in claim 9, wherein said contact part of the middle plunger has a bottom with a vaulted seating accepting a convex head of a spring-loaded tappet.

11. Apparatus as defined in claim 10, wherein said spring-loaded tappet has a pin in back of said convex head and mounting said spring, said spring comprising a helical compression spring having one end resting against the rear of said convex head and another end against the bottom of a recess guiding said head.

12. Apparatus as defined in claim 11, wherein said pin in back of said convex head of said spring-loaded tappet has a free end sliding in a perforation in said bottom of said recess receiving said helical compression spring, said pin resting against a spring-loaded piston of said two parts of the middle plunger when forced in said perforation.

13. Apparatus as defined in claim 7, wherein said spring means comprises a package of cup springs.

14. Apparatus as defined in claim 13, including a screw extending through said package of cup springs in each of plungers securing the ends of the strapping band to hold said one part with the contact roller and said other part resting against the strapping band apart at a predetermined distance and to determine level of prestress.

15. Apparatus as defined in claim 13, wherein a front surface faces away from the contact roller of said one part having the contact roller of each plunger securing an end of the band has a recess receiving the package of cup springs, an inset carrier on said other part resting against the strapping band telescoping in said recess.

16. Apparatus as defined in claim 15, including a screw holding the two parts of the plunger securing one end of the strapping band comprises a pin with a thread and cast in one piece with a free face of said carrier on said other part of the plunger resting against the band, a free end of the screw extending through a perforation in the bottom of said recess receiving the package of cup springs into a slot-shaped space for the contact roller and carrying a nut resting against the bottom of the slot-shaped space for the contact roller.

17. Apparatus as defined in claim 13, including a pin cast in one piece with a piston extending through said package of cup springs in said first plunger, said piston being housed with said package of cup springs in a recess in said one part and being subjected to the force of the cup springs, said piston resting against a free face of a T-shaped catch in said other part of the plunger facing the strapping band.

18. Apparatus as defined in claim 17, wherein said pin has a free end sliding in a perforation in a bottom of said recess receiving said package of cup springs.

19. Apparatus as defined in claim 1, wherein said first plunger securing the free front end of the strapping band has a slot through which the band extends; a cap with U-shaped cross-section and held in place on a part of the plunger facing the band with a dowel pin through one leg, said cap having a free face forming a contact and securing surface for the free front end of the strapping band.

20. Apparatus as defined in claim 1, including a cylindrical cam mounted on said shaft carrying said disc cam, said cylindrical cam inserting and retracting said hot-bonding means perpendicular to the longitudinal axis of the band.

21. Apparatus as defined in claim 20, including another cylindrical cam on said shaft carrying said disk cam for inserting and retracting a bolt holding overlapping ends of the strapping band apart.

22. Apparatus as defined in claim 1, wherein said means for advancing and tensioning the band has drive wheels with shafts parallel to said shaft perpendicular to the longitudinal axis of the strapping band and carrying said disk cam activating said three plungers.

23. Apparatus for tensioning a plastic strapping band obtained from a supply reel and positioned around a package, for connecting overlapping ends of the band by hot bonding, and for cutting off a length of band leading from the supply reel and not utilized in wrapping, said apparatus comprising: a band guide; means for advancing and tensioning a strapping band that is initially advanced in said band guide, said band guide surrounding but not being in contact with the package to be wrapped and being subsequently drawn back into a position in contact with the package while a free front end of the band is held in place and then tensioned; fastening means for hot bonding overlapping ends of the band; a backing plate between the band and the package; first, second and third plungers aligned along a longitudinal axis of the band and applicable against said backing plate, said first plunger securing the free front end of the band, said second plunger securing rear end of the band, said third plunger being a middle plunger forcing the overlapping ends of the band against hot-bonding means comprising a heated cutter compressing molten band ends together and cutting off a length of the strapping band leading from the supply reel and not utilized in wrapping, a single disk cam on a shaft perpendicular to the longitudinal axis of the band, said disk cam having a single cam contour track, said three plungers aligned along the longitudinal axis of the band being activated by said single disk cam; a contact roller, said middle plunger engaging directly said disk cam through said contact roller; pivoting positioning levers with contours, each of the two other plungers engaging through its own contact rollers the contours of said pivoting positioning levers, each of said positioning levers engaging in turn said disk cam along its circumference at a point displaced from said contact roller of said middle plunger; said middle plunger directly engaging the disk cam through said contact roller being positioned relative to the disk cam so that the projected longitudinal axis of the middle plunger intersects the axis of rotation of said shaft carrying said disk cam; one of said two positioning levers being positioned in relation to its pivot and a second contact roller operating in conjunction with said disk cam, so that a curved line of contact of said second contact roller against said disk cam precedes a point of contact of said middle plunger along the circumference of said disk cam at an angle of substantially 28°, and the other positioning lever following the point of contact of said middle plunger at the same angle; each pivoting positioning lever having a contour relating to its associated plunger so as to displace the plunger, said contour merging into a contour concentric with its respective lever pivot; springs associated with said three plungers to non-positively position the contact rollers on the plungers against said disk cam; each of said three plungers being in two parts, one of said parts being associated with the contact roller and the other part resting against the strapping band, said parts being displaced from each other to an extent limited by the force of prestressed spring means; said spring means comprising a package of cup springs; a screw extending through said package of cup springs in each of plungers securing the ends of the strapping band to hold said one part with the contact roller and said other part resting against the strapping band apart at a predetermined distance and to determine level of prestress; a front surface faces away from the contact roller of said one part having the contact roller of each plunger securing an end of the band has a recess receiving the package of cup springs, an inset carrier on said other part resting against the strapping band telescoping in said recess; a screw holding the two parts of the plunger securing one end of the strapping band comprises a pin with a thread and cast in one piece with a free face of said carrier on said other part of the plunger resting against the band, a free end of the screw extending through a perforation in the bottom of said recess receiving the package of cup springs into a slot-shaped space for the contact roller and carrying a nut resting against the bottom of the slot-shaped space for the contact roller.

* * * * *